Figure 1:
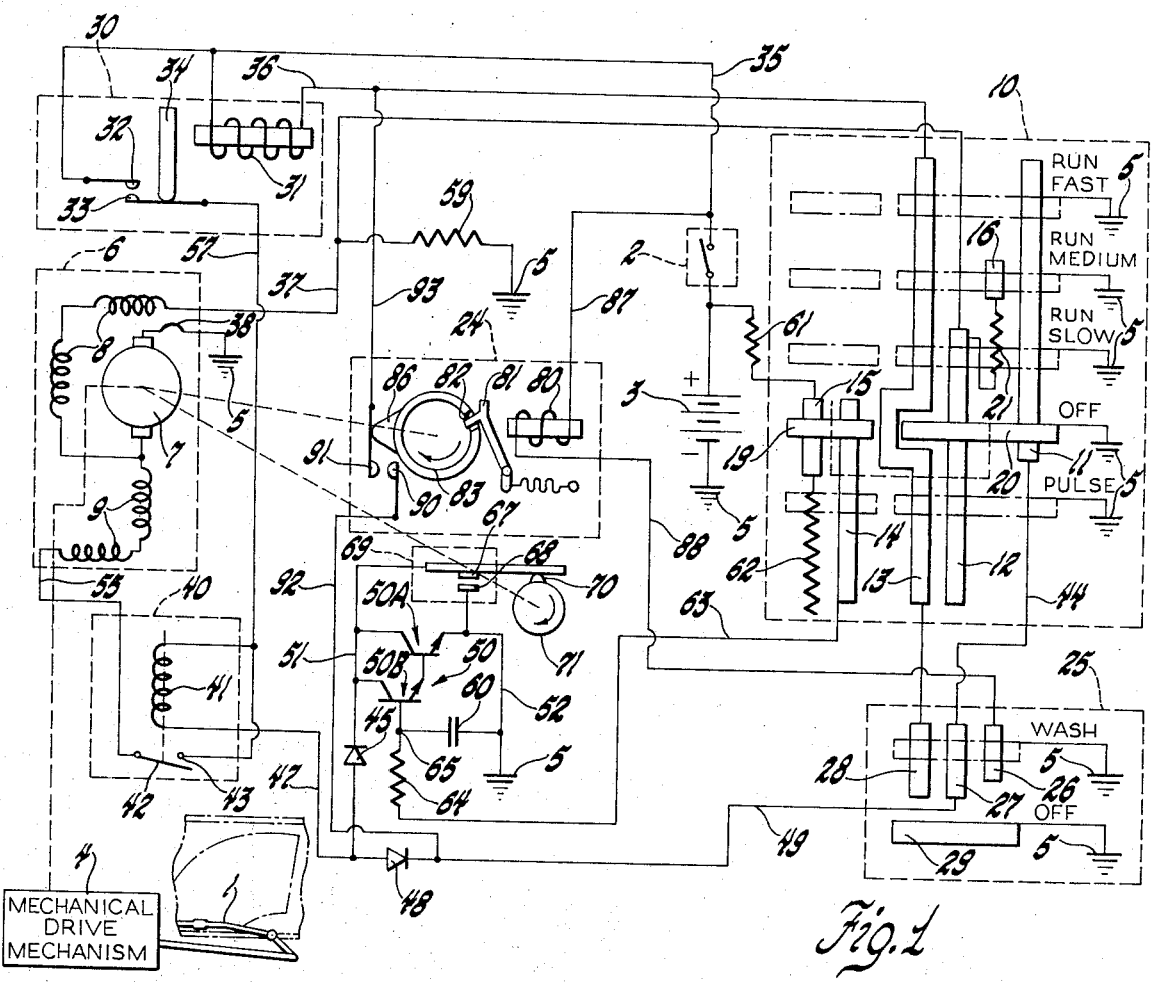

United States Patent
Bischoff et al.

[11] 3,869,654
[45] Mar. 4, 1975

[54] WINDSHIELD WIPER CONTROL CIRCUIT

[75] Inventors: Leo E. Bischoff, Centerville; Chris F. Keller, Jr., Dayton, both of Ohio

[73] Assignee: General Motors Corporation, Detroit, Mich.

[22] Filed: May 3, 1974

[21] Appl. No.: 466,614

[52] U.S. Cl............ 318/443, 318/DIG. 2, 318/483, 15/250.02
[51] Int. Cl.......... A471 1/04, B60s 1/08, H02p 1/04
[58] Field of Search............... 318/DIG. 2, 443, 483; 15/250.02

[56] References Cited
UNITED STATES PATENTS

| | | | |
|---|---|---|---|
| 3,487,492 | 1/1970 | Bischoff | 318/443 X |
| 3,689,817 | 9/1972 | Elliott | 318/DIG. 2 |
| 3,716,766 | 2/1973 | Suzuki | 318/443 X |
| 3,796,936 | 3/1974 | Kearns | 318/DIG. 2 |

*Primary Examiner*—B. Dobeck
*Attorney, Agent, or Firm*—Richard G. Stahr

[57] ABSTRACT

A windshield wiper control circuit which provides continuous and pulse wiping modes and which includes a wash unit override through which the washer unit may be energized while the wiper is operating in either mode. The drive motor energizing circuit is completed through the contacts of an electrical relay, the operating coil of which may be grounded through three separate circuits including, respectively, the contacts of a selector switch and a manual wash cycle switch in parallel, a transistor Darlington pair, and two normally closed contacts which are operated by the drive motor to the electrical circuit open condition when the wiper is in the inner wipe or "home" position. When the selector switch is operated to the Run position, the relay operating coil and drive motor are continuously energized to operate the wiper in the continuous mode and when operated to the Pulse position, the selector switch ground is removed from the relay operating coil and ground therefor is provided through the transistor Darlington pair which are triggered conductive at spaced intervals by a pulse control timing circuit coupled thereto to operate the wiper in the pulse mode. When the manual wash cycle switch is operated to the Wash position while the wipers are off or in either operating mode, the washer unit is immediately activated to deliver wash fluid to the windshield during a wash cycle. In addition, the wiper motor is immediately reactivated to an operating condition. At the conclusion of the wash fluid delivery cycle, additional drying wipes are provided and then the unit automatically returns to its previous operating mode.

4 Claims, 2 Drawing Figures

WINDSHIELD WIPER CONTROL CIRCUIT

This invention is directd to a windshield wiper control circuit and, more specifically, to a windshield wiper control circuit which provides continuous and pulse wiping modes and which includes a washer unit override feature through which the washer unit may be energized in either mode.

With conditions of light rain or mist, continously operated windshield wiper blades dry the windshield more rapidly than the light rain or mist can wet them to provide lubrication between the windshield glass and the rubber blade. Consequently, to eliminate the annoyance of the wiper blade drag across the dry windshield, it is necessary to manually interrupt the wiper blade drive motor energizing circuit when the windshield has been wiped dry and to reenergize the drive motor energizing circuit when enough mist or light rain has accumulated to require the windshield to be cleaned. This is annoying and distracting to the vehicle operator who must continuously operate a manual windshield wiper control switch. Therefore, the provision of a windshield wiper control circuit of the type which provides continuous and pulse wiping modes selectively, is desirable.

It is, therefore, an object of this invention to provide an improved windshield wiper control circuit.

It is an additional object of this invention to provide an improved windshield wiper control circuit which provides both continuous and pulse wiping modes, selectively.

It is another object of this invention to provide an improved windshield wiper control circuit which provides both continuous and pulse wiping modes, selectively, and includes a feature through which an associated windshield washer unit may be energized while the windshield wipers are operating in either the continuous or pulse wiping modes or the "Off" mode.

In accordance with this invention, an improved windshield wiper control circuit is provided wherein the wiper drive motor is energized through the normally open contacts of an electrical relay which are operated to the electrical circuit closed condition upon the energization of the relay operating coil through a manual wipe mode selector switch or a pulsing circuit which energizes the operating coil intermittently at periodic intervals to operate the wipers in the pulse mode.

Figure 2:
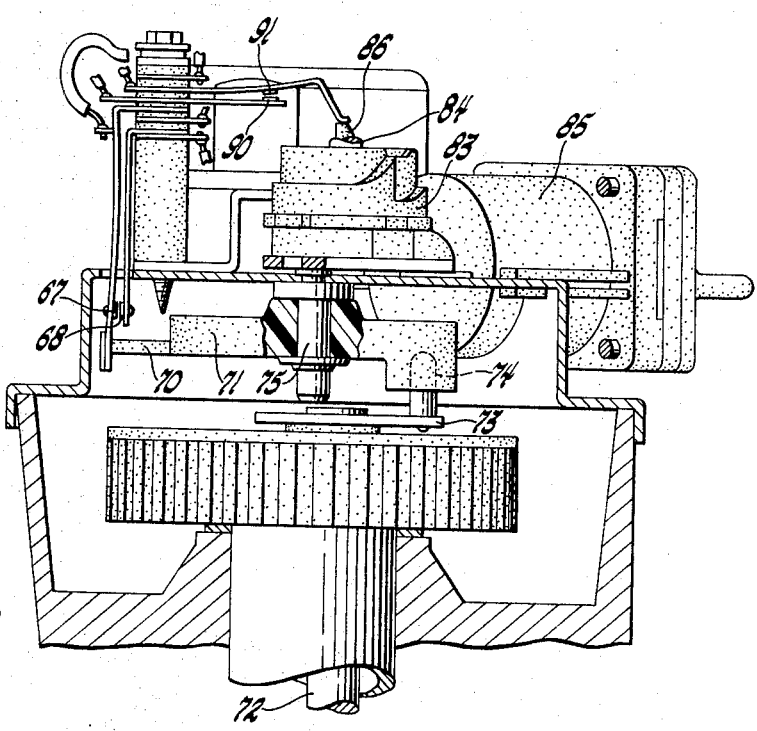

For a better understanding of the present invention, together with additional objects, advantages and features thereof, reference is made to the following description and accompanying drawing in which:

FIG. 1 illustrates the novel windshield wiper control circuit of this invention in schematic form; and FIG. 2 is a cross-sectional view of a typical windshield washer unti suitable for use with the circuit of FIG. 1 which illustrates the operation of two mechanically operated normally closed contacts of the circuit of FIG. 1.

As point of reference or ground potential is the same point electrically throughout the system, it has been represented in FIG. 1 of the drawing by the accepted schematic symbol and referenced by the numeral 5.

Referring to the drawing, wherein like elements have been assigned like characters of reference in FIGS. 1 and 2, the novel windshield wiper control circuit of this invention is set forth in FIG. 1 in schematic form in combination with a windshield wiper 1 and an electric drive motor 6 having an armature 7, a shunt field winding 8 and a series field winding 9. Drive motor 6 operates windshield wiper 1 over a normal wipe pattern between an Innner Wipe position, in which it is shown in FIG. 1, and an Outer Wipe position, and power parks windshield wiper 1 in a Park position out of the normal wipe pattern beyond the Inner Wipe position through a mechanical drive mechanism 4, as is well known in the automotive art. One example of a mechanical drive mechanism with which the control circuit of this invention may be used is shown and described in U.S. Pat. No. 3,253,206, "Windshield Wiper Actuating Mechanism," Romanowski, which issued May 24, 1966 and is assigned to the same assignee as is this invention.

The source of direct current operating potential for energizing drive motor 6 and the control circuit of this invention may be the automobile storage battery 3, having positive and negative polarity output terminals, or any other suitable direct current potential source. Without intention or inference of a limitation thereto, in FIG. 1, the positive and negative polarity output terminals of battery 3 are shown to be connected to a disconnect switch 2 and to point of reference or ground potential 5, respectively. Disconnect switch 2 may be two normally open contacts of a conventional automotive type ignition siwtch well known in the automotive art. For purposes of this specification, it will be assumed that the contacts of disconnect switch 2 are operated to the electrical circuit closed condition, as shown in FIG. 1.

An electrical selector switch 10 having a plurality of stationary contacts 11, 12, 13, 14, 15 and 16 and two gang-operated movable contacts 19 and 20 operable to at least Off, Run and Pulse positions is provided for selecting a continuous mode or a pulsed mode of operation of windshield wiper 1, in a manner to be herein later explained. Electrical selector switch 10 may be of the grounding type as shown in FIG. 1 wherein movable contact 20 is connected directly to point of reference or ground potential 5 or any other suitable electrical switch. In FIG. 1, selector switch 10 is illustrated as having an Off position, in which position it is shown in FIG. 1, a Run Slow position, a Run Medium position, a Run Fast position and a Pulse position. It is to be specifically understood that to operate windshield wiper 1 in the continuous and pulsed modes, it is only necessary that electrical selector switch 10 provide Off, Run and Pulse positions.

To selectively activate an associated windshield washer unit 24 for delivering wash fluid to the windshield when activated, in a manner to be later explained, an electrical wash cycle switch 25 of the momentary contact type having a plurality of stationary contacts 26, 27 and 28 and a movable contact 29 operable to an Off position, in which it is shown in FIG. 1, and a Wash position in which it is in electrical contact with stationary contacts 26, 27 and 28, as illustrated by dashed lines in FIG. 1, is provided. The electrical wash cycle switch 25 may also be of the grounding type wherein movable contact 29 is connected directly to point of reference or ground potential 5. It is to be specifically understood, however, that any other type electrical switch may be substituted therefor without departing from the spirit of the invention.

Upon the operation of movable contacts 19 and 20 of electrical selector switch 10 to the Run Slow position in which movable contact 20 is in electrical contact with stationary contacts 11, 12 and 13, as illustrated by dashed lines in FIG. 1, an energizing circuit is established for operating coil 31 of a power switching device 30 through a circuit which may be traced from the positive polarity terminal of battery 3 through disconnect switch 2, lead 35, coil 31, lead 36, stationary contact 13 and movable contact 20 of selector switch 10 and point of reference or ground potential 5 to the negative polarity terminal of battery 3; one end of shunt field winding 8 of drive motor 6 is connected to point of reference or ground potential 5 through lead 37 and stationary contact 12 and movable contact 20 of selector switch 10 and one end of operating coil 41 of an electrical relay 40 is connected to point of reference or ground potential 5 through a first circuit branch included in the energizing circuit thereof which may be traced through lead 47, diode 48, lead 49, stationary contact 27 of wash cycle switch 25, lead 44 and stationary contact 11 and movable contact 20 of electrical selector switch 10.

Power switching device 30 has two current carrying elements, which may be electrical contact 32 and electrical contact 33 which is spring biased to normally be in electrical circuit closing engagement with contact 32. While windshield wiper 1 is in the Park position and operating coil 31 is not energized, contact 33 is mechanically maintained out of electrical engagement with contact 32 by a mechanical latch member 34. Upon the energization of coil 31, latch member 34 is operated out of engagement with contact 33, thereby permitting contact 33 to operate to the electrical circuit closed condition with contact 32. One example of a switching arrangement which may be employed as power switching device 30 is the electromagnetically operated parking switch assembly included in the "Windshield Wiper Actuating Mechanism" disclosed and described in the previously referenced U.S. Pat. No. 3,253,206 wherein it is illustrated in FIGS. 4 through 15, is described in detail in columns 4 and 5 and the operation thereof is described in detail in columns 6 and 7.

Electrical relay 40 may be any one of the many single pole, single throw electrical relays well known in the electrical art having an operating coil 41, a stationary contact 43 and a movable contact 42 which is operated into electrical contact with stationary contact 43 upon the energization of operating coil 41 in a manner well known in the art.

Upon the energization of operating coil 31 of power switching device 30 to operate latch member 34 out of engagement with contact 33, contacts 32 and 33 operate to the electrical circuit closed condition. Upon the operation of contacts 32 and 33 to the electrical circuit closed condition, an energizing circuit is established for operating coil 41 of relay 40 through a circuit which may be traced from the positive polarity terminal of battery 3, through disconnect switch 2, lead 35, contacts 32 and 33, lead 57, operating coil 41, lead 47, diode 48, lead 49, stationary contact 27 of wash cycle switch 25, lead 44, stationary contact 11 and movable contact 20 of selector switch 10 and point of reference or ground potential 5 to the negative polarity terminal of battery 3. Upon the energization of operating coil 41 of relay 40, movable contact 42 thereof is operated into electrical contact with stationary contact 43 to complete an energizing circuit for drive motor 6 which may be traced from the positive polarity terminal of battery 3, through disconnect switch 2, lead 35, contacts 32 and 33, lead 57, stationary contact 43 and movable contact 42 of pulse relay 40, lead 55 and series field winding 9 and therethrough a first circuit branch of armature 7, circuit breaker 38 and point of reference or ground potential 5 to the negative polarity terminal of battery 3 and a second circuit branch of shunt field winding 8, lead 37, stationary contact 12 and movable contact 20 of selector switch 10 and point of reference or ground potential 5 to the negative polarity terminal of battery 3. Consequently, with movable contact 20 of electrical selector switch 10 in the Run Slow position, drive motor 6 operates windshield wiper 1 in the continuous mode at the slowest speed.

When movable contact 20 of electrical selector switch 10 is operated to the Run Medium position in electrical contact with stationary contacts 11, 13 and 16, as illustrated by dashed lines in FIG. 1, the energizing circuit for operating coil 31 of power switching device 30 is established and one end of operating coil 41 of relay 40 is connected to point of reference or ground potential 5 through the circuit previously explained and the parallel combination of resistance 59 and resistance 21 is connected in series with shunt field winding 8 of drive motor 6. The parallel resistance combination in series with shunt field winding 8 weakens shunt field winding 8, consequently, drive motor 6 runs at an intermediate higher speed to operate windshield wiper 1 in the continuous mode at the medium speed.

When movable contact 20 of electrical selector switch 10 is operated to the Run Fast position in electrical contact with stationary contacts 11 and 13, as illustrated by dashed lines in FIG. 1, the energizing circuit for operating coil 31 of power switching device 30 is established, one end of operating coil 41 of relay 40 is connected to point of reference or ground potential 5 and resistance 59 is connected in series with the shunt field winding 8 of drive motor 6. As the ohmic value of resistance 59 is greater than the ohmic value of parallel resistances 21 and 59, the shunt field winding 8 of drive motor 6 is further weakened, consequently, drive motor 6 runs at a higher speed to drive windshield wiper 1 in the ocntinuous mode at the fastest speed.

Upon the operation of movable contact 20 of electrical selector switch 10 to the Off position, ground is removed from operating coil 31 of power switching device 30, consequently, mechanical latch member 34 is released thereby but remains out of engagement with contact 33. Consequently, drive motor 6 remains energized until it has driven windshield wiper 1 into the Park position through an associated power parking mechanism. The power parking mechanism mechanically operates mechanical latch member 34 into engagement with contact 33 of power switching device 30 to open contacts 32 and 33. Upon the operation of contacts 32 and 33 open, battery is removed from the system, consequently, the windshield wiper 1 remains in the Park position and the system is deenergized. As has been previously brought out, one example of a power parking mechanism and switching arrangement through which drive motor 6 may operate windshield wiper 1 to the depressed Park position and deenergize the system when windshield wiper 1 is in the depressed Park position is disclosed and described in detail in the previously referenced U.S. Pat. No. 3,253,206.

To operate windshield wiper 1 in the pulse mode, an electrical switching device having normally open current carrying elements, a pulse control timing circuit electrically coupled thereto and a mechanically operated electrical switching device having normally closed current carrying elements which are operated to the electrical circuit open condition when windshield wiper 1 is in the inner wipe position are provided.

The electrical switching device is illustrated in FIG. 1 as an NPN transistor Darlington pair 50 having the current carrying elements thereof connected in series in a second circuit branch included in the relay 40 operating coil 41 energizing circuit. This second circuit branch may be traced from the lower terminal end of operating coil 41, as viewing FIG. 1, through lead 47, diode 45, lead 51, the collector-emitter electrodes of NPN transistor 50B of the transistor Darlington pair 50 and lead 52 to point of reference or ground potential 5. It is to be specifically understood that any other suitable electrical switching device having normally open current carrying elements electrically operable to the electrical circuit closed condition may be substituted for NPN transistor Darlington pair 50 without departing from the spirit of the invention.

The pulse control timing circuit which is activated white the movable contacts of electrical selector switch 10 are operated to the Pulse position includes movable contact 19 and stationary contacts 14 and 15 of selector switch 10, resistors 61, 62 and 64 and capacitor 60. Movable contact 19 of selector switch 10 is arranged to be in sliding electrical contact with resistor 62 in a manner well known in the variable resistance and rheostat art and movable contacts 19 and 20 of selector switch 10 are operable in a direction along resistor 62, as viewing FIG. 1. Consequently, resistor 62 and movable contact 19 function as a variable resistor or rheostat for reasons to be later explained. It is to be specifically understood that any other suitable arrangement for providing a variable resistance by operating movable contact 19 of selector switch 10 may be substituted for this arrangement. The timing circuit is electrically coupled to the electrically operable switching device, transistor Darlington pair 50, by connecting the base electrode of NPN transistor 50A of the Darlington pair 50 to junction 65 between resistor 64 and capacitor 60.

The mechanically operated electrical switching device 69 may be of the type having a movable contact 67 and stationary contact 68 wherein movable contact 67 is spring biased to normally be in electrical contact engagment with stationary contact 68. Electrical contacts 67 and 68 are arranged to be operated to the electrical circuit open condition by a cam member 70 upon a rotating member 71 when windshield wiper 1 is in the inner wipe position and are connected in series in a third circuit branch of the relay 40 operating coil 41 energizing circuit. This third circuit branch may be traced from the lower end of operating coil 41, as viewing FIG. 1, through lead 47, diode 45, lead 51, movable contact 67 and stationary contact 68 of the mechanically operated switching device and lead 52 to point of reference or ground potential 5. With this arrangement, these electrical contacts of the mechanically operated switching device close the third circuit branch of the relay 40 operating coil 41 energizing circuit when windshield wiper 1 is moved away from the inner wipe position and interrupt this third circuit branch when the windshield wiper 1 is in the inner wipe position. One method for providing for the operation of electrical contacts 67 and 68 to the electrical circuit open condition when windshield wiper 1 is in the inner wipe position and for allowing movable contact 67 to move into electrical engagement with stationary contact 68 when windshield wiper 1 is moved away from the inner wipe position is to mount these electrical contacts on a windshield washer unit of the type disclosed and described in detail in U.S. Pat. No. 3,503,091, "Fast Response Windshield Washer," R. G. Petry, et al, which issued Mar. 31, 1970 and is assigned to the same assignee as is this invention. Briefly, rotating member 71 is in the position illustrated in FIG. 2 while windshield wiper 1 is in the inner wiper position with cam member 70 engaging movable contact 67, thereby operating the mechanical switching device 69 to the electrical circuit open condition. Drive motor 6, when energized, rotates shaft member 72 which, in turn, rotates a crank arm 73 having one end secured to shaft 72. A drive pin 74 secured to the other end of crank arm 73 engages rotating member 71. Consequently, as shaft 72 is rotated by drive motor 6, drive pin 74 rotates rotating member 71 upon a stub shaft 75. During one complete revolution of crank 73 and, therefore, rotating member 71, windshield wiper 1 is driven by drive motor 6 from the inner wipe position to the outer wipe position and returned to the inner wipe position. Consequently, each time windshield wiper 1 is returned to the inner wipe position, cam member 70 engages movable contact 67 to operate mechanical switching device 69 to the electrical circuit open condition. As cam member 70 is so shpaed to operate movable contact 67 out of engagement with stationary contact 68 only while windshield wiper 1 is in the inner wipe position, movable contact 67 and stationary contact 68 are in the electrical circuit open condition when windshield wiper 1 is in the inner wipe position and in the electrical circuit closed condition when windshield wiper 1 is moved away from the inner wipe position.

Upon the operation of movable contacts 19 and 20 of electrical selector switch 10 to the Pulse position wherein movable contact 20 is in electrical contact with stationary contacts 12 and 13 and movable contact 19 is in electrical contact with stationary contact 14 and resistor 62, illustrated by dashed lines in FIG. 1, the energizing circuit is established for operating coil 31 of power switching device 30 through a circuit which may be traced from the positive polarity terminal of battery 3, through disconnect switch 2, lead 35, coil 31, lead 36, stationary contact 13 and movable contact 20, selector switch 10 and point of reference or ground potential 5 to the negative polarity terminal of battery 3; one end of shunt field winding 8 of drive motor 6 is connected to point of reference or ground potential 5 thorugh lead 37 and stationary contact 12 and movable contact 20 of selector switch 10 and capacitor 60 is connected across battery 3 through a circuit which may be traced from the positive polarity terminal of battery 3, through resistor 61, stationary contact 15 of electrical selector switch 10, resistor 62, movable contact 19, stationary contact 14, lead 63, resistor 64, capacitor 60 and point of reference or ground potential 5 to the negative polarity terminal of battery 3. Therefore, capacitor 60 begins to charge and operating coil 31 of power switching device 30 is energized. Upon the energization of operating coil 31 to operate latch member 34 out of engagement with contact 33, contact 33 operates to the electrical circuit closed condition with contact 32. Upon the operation of contacts 33 and 32 to the electrical circuit closed condition, the positive polarity output terminal of battery 3 is connected to the upper terminal end of operating coil 41 of relay 40, as viewing FIG. 1, through disconnect switch 2, lead 35, contacts 32 and 33 and lead 57. When the charge upon capacitor 60 has reached a value of sufficient magnitude to produce base-emitter drive current through NPN transistor 50A of transistor Darlington pair 50, transistor Darlington pair 50 conducts to establish the second circuit branch of the relay 40 operating coil 41 energizing circuit. As the positive polarity terminal of battery 3 is connected to the opposite terminal end of operating coil 41 through the circuit previously described, operating coil 41 is energized upon the conduction of transistor Darlington pair 50 to close movable contact 42 thereof to stationary contact 43. Upon the closure of movable contact 42 to stationary contact 43, the energizing circuit, previously described, for drive motor 6 is established, consequently, armature 7 begins to rotate. Rotating armature 7 drives windshield wiper 1 out of the inner wipe position toward the outer wipe position and drives shaft 72 which rotates rotating member 71 through crank arm 73 and drive pin 74. When cam 70 is rotated out of engagement with movable contact 67 of mechanical switching device 69, movable contact 67 operates into electrical engagement with stationary contact 68 to establish the third circuit branch of the relay 40 operating coil 41 energizing circuit. The charge upon capacitor 60 quickly dissipates through the base-collector junction of transistor 50A, contacts 67 and 68, lead 52 and point of reference or ground potential 5 to the negative side of capacitor 60. This resets capacitor 60 to one junction drop from which it must recharge to two junction drops during the next dwell period. Movable contact 67 and stationary contact 68 of mechanically operated switching device 69, however, maintain the energizing circuit for operating coil 41 of relay 40. As this circuit is maintained, drive motor 6 drives windshield wiper 1 to the outer wipe position and returns it to the inner wipe position in which cam 70 of rotating member 71 operates movable contact 67 out of engagement with stationary contact 68 to interrupt the energizing circuit for the operating coil 41 of relay 40. Upon the interruption of this energizing circuit, movable contact 42 of relay 40 operates out of electrical contact with stationary contact 43 to interrupt the energizing circuit for drive motor 6, consequently, drive motor 6 stops with windshield wiper 1 in the inner wipe position. When the charge upon capacitor 60 has again reached a value of sufficient magnitude to produce base-emitter drive current through transistor 50A of transistor Darlington pair 50, these devices again conduct to complete the second circuit branch of the operating coil 41 of relay 40 to close movable contact 42 thereof to stationary contact 43. Upon the operation of movable contact 42 into electrical contact with stationary contact 43, the energizing circuit for drive motor 6 is again established and drive motor 6 drives windshield wiper 1 through another complete arcuate wipe pattern from the inner wipe position to the outer wipe position and back to the inner wipe position in which cam 70 of rotating member 71 again operates movable contact 67 out of electrical engagement with stationary contact 68 to interrupt the energizing circuit for operating coil 41 of relay 40 and drive motor 6 stops with windshield wiper 1 in the inner wipe position. This is the pulse mode of operation of windshield wiper 1 which continues so long as the movable contacts of selector switch 10 are in the Pulse position.

As the period of time required for capacitor 60 to reach a charge of a value of sufficient magnitude to produce base-emitter drive current through transistor 50A of transistor Darlington pair 50 is determined by the R-C time constant of the charging circuit of capacitor 60, previously described, the further movable contact 19 of selector switch 10 is moved along resistor 62, the greater the resistance inserted in series in the charging circuit, consequently, the longer the period between energization of drive motor 6. From the foregoing description, it is apparent that the pulse control timing circuit periodically operates the normally open current carrying elements of transistor Darlington pair 50 to the electrical circuit closed condition at spaced intervals whereby the second circuit branch of the energizing circuit for the operating coil 41 or relay 40 is periodically completed at spaced intervals, the pulse control timing circuit determining the repetition rate of the spaced intervals depending upon the setting of movable contact 19 of electrical selector switch 10 on resistor 62, the nearer the bottom of resistor 62, as looking at FIG. 1, the longer the space between intervals.

It may be noted that with the movable contacts of selector switch 10 in the Off position, capacitor 60 is connected across battery 3 through resistor 61, stationary contact 15 of selector switch 10, movable contact 19, stationary contact 14, lead 63 and resistor 64 and through point of reference or ground potential 5. This circuit maintains a charge upon capacitor 60. This charge substantially reduces the delay period between the operation of the movable contacts of selector switch 10 to the Pulse position and the initial wipe cycle of the pulse mode of operation.

From this description, it is apparent that the energizing circuit for operating coil 41 of relay 40 includes first, second and third circuit branches all connected to the same terminal end thereof; that movable contact 20 and stationary contact 11 of electrical selector switch 10 are connected in series in the first circuit branch of the energizing circuit of operating coil 41 of relay 40 and arranged to be in electrical circuit closed condition when the movable contacts of selector switch 10 are in the Off and Run positions and in the electrical circuit open condition when the movable contacts of selector switch 10 are in the Pulse position and that power switching device 30 has current carrying elements which operate to the electrical circuit closed condition in response to the operation of the movable contacts of selector switch 10 to either the Run position or the Pulse position connected in series in the drive motor 6 energizing circuit and the relay operating coil 41 energizing circuit.

The windshield wiper control circuit of this invention is readily adaptable for use with a windshield washer unit, referenced by numeral 24 in FIG. 1, for delivering wash fluid to the windshield during a wash cycle, when activated. One example of a washer unit suitable for use with the windshield wiper control circuit of this invention is disclosed in the previously referenced U.S. Pat. No. 3,503,091 wherein the mechanism and operation is completely described in detail. Briefly, upon each energization of an operating coil 80, a ratchet member 81 is pulled out of engagement with a slot 82 in a ratchet wheel 83 which is rotatably supported upon a stub shaft 84. Upon the disengagement of ratchet member 81 from slot 82, ratchet wheel 83 is indexed around through a driving mechanism, not shown, for a complete revolution until ratchet member 81 again engages slot 82 to complete one wash cycle. During each wash cycle, a pump member 85 delivers wash fluid to the windshield.

A mechanically operated electrical switching device having normally closed current carrying elements, which may be electrical contacts 90 and 91, are connected between stationary contact 11 and movable contact 20 and stationary contact 13 and movable contact 20 of electrical selector switch 10 through leads 92 and 49, stationary contact 27 of washer switch 25 and lead 44 and through leads 93 and 36, respectively. This electrical switching device is preferably of the type having movable contact 91 spring biased in a direction to engage stationary contact 90 in electrical contact. Ratchet wheel 83 of washer unit 24 is provided with a cam 86 which is arranged to engage and operate movable contact 91 out of engagement with stationary contact 90 at the conclusion of each wash cycle and while washer unit 24 is idle and to be moved out of engagement with movable contact 91 during each wash cycle. That is, electrical contacts 90 and 91 are operated to and maintained in the electrical circuit open condition when washer unit 24 has completed a wash cycle and operate to the electrical circuit closed condition during each wash cycle.

While the movable contacts of electrical selector switch 10 are in the Off position, the first circuit branch of the relay 40 operating coil 41 energizing circuit is completed to point of reference or ground potential 5 through a circuit which may be traced from the lower terminal end of operating coil 41, as viewing FIG. 1, through lead 47, diode 48, lead 49, stationary contact 27 of wash cycle switch 25, lead 44, and stationary contact 11 and movable contact 20 of electrical selector switch 10. Upon the momentary operation of movable contact 29 of wash cycle switch 25 to the Wash position to intiate a wash cycle, an activating circuit for washer unit 24 is established through a circuit which may be traced from the positive polarity terminal of battery 3, through disconnect switch 2, lead 87, operating coil 80 of washer unit 24, lead 88, stationary contact 26 and movable contact 29 of wash cycle switch 25 and point of reference or ground potential 5 to the negative polarity terminal of battery 3 and an energizing circuit is established for operating coil 31 of power switching device 30 through a circuit which may be traced from the positive polarity terminal of battery 3, through disconnect switch 2, lead 35, operating coil 31, lead 36, stationary contact 13 of electrical selector switch 10, lead 22, stationary contact 28 and movable contact 29 of wash cycle switch 25 and point of reference or ground potential 5 to the negative polarity terminal of battery 3. Upon the completion of the energizing circuits for operating coil 31 of power switching device 30 and operating coil 80 of washer unit 24, drive motor 6 is energized through circuitry previously described to drive windshield wiper 1 through the normal wipe pattern and washer unit 24 is activated. Upon the activation of washer unit 24, drive motor 6 begins to index ratchet wheel 83 through one revolution and wash fluid is delivered to the windshield during the wash cycle. With the first index step of ratchet wheel 83, cam 86 is moved out of engagement with movable contact 91 which closes to stationary contact 90 during the wash cycle. When contacts 90 and 91 close, momentary contact wash cycle switch 25 may be released and permitted to operate to the Off position. When movable contact 29 of wash cycle switch 25 operates to the Off position, the first circuit branch of the relay 40 operating coil 41 energizing circuit remains established through movable contact 20 and stationary contact 11 of electrical selector switch 10, that portion of the energizing circuit of operating coil 31 of power switching device 30 which was completed through stationary contact 28 and movable contact 29 of wash cycle switch 25 when in the Wash position is interrupted and the energizing circuit of operating coil 80 of washer unit 24 is interrupted. However, another alternate energizing circuit is established for operating coil 31 of power switching device 30 through contacts 90 and 91 which may be traced from the positive polarity terminal of battery 3, through disconnect switch 2, lead 35, operating coil 31, leads 36 and 93, movable contact 91 and stationary contact 90, leads 92 and 49, stationary contact 27 of wash cycle switch 25, lead 44, stationary contact 11 and movable contact 20 of electrical selector switch 10 and point of reference or ground potential 5 to the negative polarity terminal of battery 3. Drive motor 6 remains energized through the energizing circuitry previously described to operate washer unit 24 through the wash cycle until ratchet wheel 83 has been indexed through one complete revolution to the position in which ratchet member 81 engages slot 82 in ratchet wheel 83 to deactivate washer unit 24 and cam 86 engages movable contact 91 and moves it out of engagement with stationary contact 90 to interrupt the alternate energizing circuit of operating coil 31 of the power switching device 30. After the energizing circuit of operating coil 31 has been interrupted, drive motor 6 and the mechanical drive mechanism 4 return windshield wiper 1 to the Inner Wipe position and drive it into the depressed Park position in which mechanical latch member 34 of power switching device 30 operates movable contact 33 out of engagement with stationary contact 32 to interrupt the energizing circuit for drive motor 6.

While the movable contacts of selector switch 10 are in the Pulse position, the energizing circuit for operating coil 31 of power switching device 30 is established through stationary contact 13 and movable contact 20 of selector switch 10, as previously described. Upon the momentary operation of movable contact 29 of wash cycle switch 25 to the Wash position to initiate a wash cycle, the activating circuit, previously described, is established for washer unit 24 and the first circuit branch of the relay 40 operating coil 41 energizing circuit is completed to point of reference or ground potential 5 through stationary contact 27 and movable contact 29. Upon the completion of the energizing circuits for operating coil 41 of relay 40 and operating coil 80 of washer unit 24, drive motor 6 is energized through circuitry previously described to drive windshield wiper 1 through the normal wipe pattern and washer unit 24 is activated. Upon the activation of washer unit 24, drive motor 6 begins to index ratchet wheel 83 through one revolution and wash fluid is delivered to the windshield during the wash cycle. With the first index step of ratchet wheel 83, cam 86 is moved out of engagement with movable contact 91 which closes to stationary contact 90 during the wash cycle. When contacts 90 and 91 close, momentary contact wash cycle switch 25 may be released and permitted to operate to the Off position. When movable contact 29 of wash cycle switch 25 operates to the Off position, the first circuit branch of the relay 40 operating coil 41 energizing circuit is interrupted and the energizing circuit for operating coil 80 of washer unit 24 is interrupted. However, the second circuit branch of the relay 40 operating coil 41 is maintained through contacts 67 and 68 of electrical switching device 69 to maintain contacts 42 and 43 thereof closed. Drive motor 6, therefore, remains energized to operate washer unit 24 through the wash cycle until ratchet wheel 83 has been indexed through one complete revolution to the position in which ratchet member 81 engages slot 82 in ratchet wheel 83 to deactivate washer unit 24 and cam 86 engages movable contact 91 and moves it out of engagement with stationary contact 90 and cam member 70 operates movable contact 67 out of engagement with stationary contact 68 to interrupt the energizing circuit for operating coil 41 of relay 40. Upon the deenergization of operating coil 41, relay contacts 42 and 43 operate to the electrical circuit open condition to interrupt the drive motor 6 energizing circuit. As operating coil 31 of power switching device 30 remains energized and since capacitor 60 is connected across battery 3 through the timing pulse control circuit previously described while the movable contacts of selector switch 10 are in the Pulse position, at the conclusion of the wash cycle, the windshield wiper continues to operate in the Pulse mode.

While the movable contacts of electrical selector switch 10 are in the Run position, the first circuit branch of the relay 40 operating coil 41 energizing circuit is completed to point of reference or ground potential 5 through a circuit previously described and the energizing circuit for operating coil 31 of power switching device 30, previously described, is established. Upon the momentary operation of movable contact 29 of wash cycle switch 25 to the Wash position to initiate a wash cycle, the activating circuit for wash unit 24, previously described, is established. Upon the completion of the energizing circuit for operating coil 80 of washer unit 24, washer unit 24 is activated. Upon the activation of washer unit 24, drive motor 6 begins to index ratchet wheel 83 through one revolution and wash fluid is delivered to the windshield during the wash cycle. Although contacts 90 and 91 operate closed after the first index step of ratchet wheel 83 to move cam 86 out of engagement with movable contact 91, these contacts do not affect circuit operation with the movable contacts of selector switch 10 in the Run position as the energizing circuit for operating coil 31 of power switching device 30 is maintained through stationary contact 13 and movable contact 20 of selector switch 10 and the relay 40 operating coil 41 energizing circuit is maintained through stationary contact 11 and movable contact 20 of selector switch 10. As operating coil 41 of relay 40 remains energized, the contacts 42 and 43 thereof remain in the electrical circuit closed condition to complete the drive motor 6 energizing circuit. When movable contact 29 of wash cycle switch 25 operates to the Off position, the energizing circuit of operating coil 80 of washer unit 24 is interrupted, however, drive motor 6 operates washer unit 24 through the wash cycle until ratchet wheel 83 has been indexed through one complete revolution to the position in which ratchet member 81 engages slot 82 in ratchet wheel 83 to deactivate washer unit 24 and cam 86 engages movable contact 91 and moves it out of engagement with stationary contact 90. As operating coil 31 of power switching device 30 and, consequently, drive motor 6 remain energized, at the conclusion of the wash cycle the windshield wiper continues to operate in the continuous mode.

While a preferred emboidment of the present invention has been shown and described, it will be obvious to those skilled in the art that various modifications and substitutions may be made without departing from the spirit of the invention which is to be limited only within the scope of the appended claims.

What is claimed is:

1. A windshield wiper control circuit comprising in combination with a windshield wiper and an electric drive motor having an armature and at least a shunt field winding for driving the windshield wiper over a normal wipe pattern between inner and outer wipe positions; an electrical relay having an operating coil and normally open contacts; and energizing circuit for said relay operating coil including first, second and third circuit branches all connected to the same terminal end thereof; an energizing circuit for said motor shunt field winding; an energizing circuit for said motor armature including said normally open contacts of said relay in series; an electrical selector switch having a plurality of stationary contacts and two gang-operated movable contacts operable to at least Off, Run and Pulse positions, one of said movable contacts and one of said stationary contacts being connected in series in said first circuit branch of said relay operating coil energizing circuit and arranged to be in electrical circuit closed condition when said movable contacts are in said Off and Run positions and in the electrical circuit open condition when said movable contacts are in said Pulse position; a first electrical switching device having normally open current carrying elements electrically operable to the electrical circuit closed condition connected in series in said second circuit branch of said relay operating coil energizing circuit; a pulse control timing circuit activated while said movable contacts of said selector switch are operated to the Pulse position electrically coupled to said first electrical switching device for periodically operating said normally open current carrying elements thereof to the electrical circuit closed condition at spaced intervals whereby said second circuit branch of said relay operating coil is periodically completed at spaced intervals, said pulse control timing circuit determining the repetition rate of said spaced intervals; a second electrical switching device having normally closed current carrying elements which are operated to the electrical circuit open condition when said windshield wiper is in said inner wipe position connected in series in said third circuit branch of said relay operating coil energizing circuit for closing said third circuit branch when said windshield wiper is moved away from said inner wipe position and for interrupting said third circuit branch when said windshield wiper is in said inner wipe position; and a power switching device having current carrying elements which operate to the electrical circuit closed condition in response to the operation of said movable contacts of said selector switch to either said Run position or said Pulse position connected in series in said motor shunt field winding energizing circuit, said motor armature energizing circuit and said relay operating coil energizing circuit whereby said drive motor is continuously energized while said movable contacts of said selector switch are in said Run position and said motor is periodically energized at spaced intervals while said movable contacts of said selector switch are in said Pulse position.

2. A windshield wiper control circuit comprising in combination with a windshield wiper, an electric drive motor having an armature and at least a shunt field winding for driving the windshield wiper over a normal wipe pattern between inner and outer wipe positions and a source of direct current potential having positive and negative polarity output terminals; an electrical relay having an operating coil and normally open contacts; an energizing circuit for said relay operating coil including first, second and third circuit branches through which a selected one terminal end thereof may be connected to a selected one of said output terminals of said source of direct current potential; an energizing circuit for said motor shunt field winding; an energizing circuit for said motor armature including said normally open contacts of said relay in series; an electrical selector switch having a plurality of stationary contacts and two gang-operated movable contacts operable to at least Off, Run and Pulse positions, one of said movable contacts and one of said stationary contacts being connected in series in said first circuit branch of said relay operating coil energizing circuit and arranged to be in electrical circuit closed condition when said movable contacts are in said Off and Run positions and in the electrical circuit open condition when said movable contacts are in said Pulse position; a transistor having normally open current carrying elements electrically operable to the electrical circuit closed condition connected in series in said second circuit branch of said relay operating coil energizing circuit; a pulse control timing circuit activated while said movable contacts of said selector switch are operated to the Pulse position electrically coupled to said transistor for periodically operating said normally open current carrying elements thereof to the electrical circuit closed condition at spaced intervals whereby said second circuit branch of said relay operating coil is periodically completed at spaced intervals, said pulse control timing circuit determining the repetition rate of said spaced intervals; an electrical switching device having normally closed current carrying elements which are operated to the electrical circuit open condition when said windshield wiper is in said inner wipe position connected in series in said third circuit branch of said relay operating coil energizing circuit for closing said third circuit branch when said winshield wiper is moved away from said inner wipe position and for interrupting said third circuit branch when said windshield wiper is in said inner wipe position; and a power switching device having current carrying elements which operate to the electrical circuit closed condition in response to the operation of said movable contacts of said selector switch to either said Run position or said Pulse position connected in series in said motor shunt field winding energizing circuit, said motor armature energizing circuit and said relay operating coil energizing circuit whereby said drive motor is continuously energized while said movable contacts of said selector switch are in said Run position and said motor is periodically energized at spaced intervals while said movable contacts of said selector switch are in said Pulse position.

3. A windshield wiper control circuit comprising in combination with a windshield wiper, an electric drive motor having an armature and at least a shunt field winding for driving the windshield wiper over a normal wipe pattern between inner and outer wipe positions and a source of direct current potential having positive and negative polarity output terminals; an electrical relay having an operating coil and normally open contacts; an energizing circuit for said relay operating coil including first, second and third circuit branches through which a selected one terminal end thereof may be connected to a selected one of said output terminals of said source of direct current potential; an energizing circuit for said motor shunt field winding; an energizing circuit for said motor armature including said normally open contacts of said relay in series; and electrical selector switch haiving a plurality of stationary contacts and two gang-operated movable contacts operable to at least Off, Run, and Pulse positions; means for connecting one of said movable contacts and one of said stationary contacts of said selector switch in series in said first circuit branch of said relay operating coil energizing circuit and arranged to be in electrical circuit closed condition when said movable contacts are in said Off and Run positions and in the electrical circuit open condition when said movable contacts are in said Pulse position; a transistor Darlington pair having normally open current carrying elements electrically operable to the electrical circuit closed condition connected in series in said second circuit branch of said relay operating coil energizing circuit; a pulse control timing circuit including the series combination of a variable resistance and a capacitor activated while said movable contacts of said selector switch are operated to the Pulse position electrically coupled to said transistor Darlington pair for periodically operating said normally open current carrying elements thereof to the electrical circuit closed condition at spaced intervals whereby said second circuit branch of said relay operating coil is periodically completed at spaced intervals, said pulse control timing circuit determining the repetition rate of said spaced intervals; an electrical switching device having normally closed current carrying elements which are operated to the electrical circuit open condition when said winshield wiper is in said inner wipe position connected in sereis in said third circuit branch of said relay operating coil energizing circuit for closing said third circuit branch when said windshield wiper is moved away from said inner wipe position and for interrupting said third circuit branch when said windshield wiper is in said inner wipe position; and a power switching device having current carrying elements which operate to the electrical circuit closed condition in response to the operation of said movable contacts of said selector switch to either said Run position or said Pulse position connected in series in said motor shunt field winding energizing circuit, said motor armature energizing circuit and said relay operating coil energizing circuit whereby said drive motor is continuously energized while said movable contacts of said selector switch are in said Run position and said motor is periodically energized at spaced intervals while said movable contacts of said selector switch are in said Pulse position.

4. A windshield wiper control circuit comprising in combination with a windshield wiper, an electric drive motor having an armature and at least a shunt field winding for driving the windshield wiper over a normal wipe pattern between inner and outer wipe positions and a washer unit for delivering washer fluid to the windshield during a wash cycle when activated; an electrical relay having an operating coil and normally open contacts; an energizing circuit for said relay operating coil including first, second and third circuit branches all connected to the same terminal end thereof; an energizing circuit for said motor shunt field winding; an energizing circuit for said motor armature including said normally open contacts of said relay in series; an electrical selector switch having a plurality of stationary contacts and two gang-operated movable contacts operable to at least Off, Run and Pulse positions, one of said movable contacts and a first one of said stationary contacts being connected in series in said first circuit branch of said relay operating coil energizing circuit and arranged to be in electrical circuit closed condition when said movable contacts are in said Off and Run positions and in the electrical circuit open condition when said movable contacts are in said Pulse position; an electrical wash cycle switch of the momentary contact type having a plurality of stationary contacts and a movable contact operable to Off and Wash positions, said movable contact and a first one of said stationary contacts being connected in parallel with said one of said movable contacts and said first one of said stationary contacts of said selector switch in said first circuit branch of said relay operating coil energizing circuit and arranged to be in electrical circuit closed condition when said movable contact is in said Wash position and in the electrical circuit open condition when said movable contact is in said Off position and said movable contact and a second one of said stationary contacts being arranged to establish an activating circuit for said wash unit when said movable contact is in said Wash position; a first electrical switching device having normally open current carrying elements electrically operable to the electrical circuit closed condition connected in series in said second circuit branch of said relay operating coil energizing cirucit; a pulse control timing circuit activated while said movable contacts of said selector switch are operated to the Pulse position electrically coupled to said first electrical switching device for periodically operating said normally open current carrying elements thereof to the electrical circuit closed condition at spaced intervals whereby said second circuit branch of said relay operating coil is periodically completed at spaced intervals, said pulse control timing circuit determining the repetition rate of said spaced intervals; a second electrical switching device having normally closed current carrying elements which are operated to the electrical circuit open condition when said windshield wiper is in said inner wipe position connected in series in said third circuit branch of said relay operating coil energizing circuit for closing said third circuit branch when said windshield wiper is moved away form said inner wipe position and for interrupting said third circuit branch when said windshield wiper is in said inner wipe position; a power switching device having an operating coil and current carrying elements which operate to the electrical circuit closed condition in response to the energization of said operating coil connected in series in said motor shunt field winding energizing circuit, said motor armature energizing circuit and said relay operating coil energizing circuit whereby said drive motor is continuously energized while said movable contacts of said selector switch are in said Run position and said motor is periodically energized at speced intervals while said movable contacts of said selector switch are in said Pulse position, an energizing circuit for said operating coil of said power switching device including the parallel combination of said one of said movable contacts and a second one of said stationary contacts of said selector switch arranged to be in the electrical circuit closed condition when said movable contacts are in said Run and Pulse positions and said movable contact and a third one of said stationary contacts of said wash cycle switch arranged to be in the electrical circuit closed condition when said movable contact is in said Wash position; and a third electrical switching device having normally closed current carrying elements connected between said normally open contacts of said electrical relay and said second one of said stationary contacts and said one of said movable contacts of said selector switch which are operated to and maintained in the electrical circuit open condition when said washer unit has completed a wash cycle for maintaining an energizing circuit for said operating coil of said power switching device during each wash cycle when said movable contacts of said selector switch are in said Off position and for maintaining said motor armature energizing circuit during each wash cycle when said movable contacts of said selector switch are in said Pulse position.

* * * * *